United States Patent [19]

Marsch

[11] 3,929,037

[45] Dec. 30, 1975

[54] SIX SPEED POWER SHIFT TRANSMISSION

[75] Inventor: James E. Marsch, Brookfield, Wis.

[73] Assignee: Allis-Chalmers Corporation, Milwaukee, Wis.

[22] Filed: May 30, 1974

[21] Appl. No.: 474,673

[52] U.S. Cl. .............. 74/759; 74/758; 74/705
[51] Int. Cl.² .................. F16H 57/10; F16H 37/06
[58] Field of Search .............. 74/758, 759, 753, 705

[56] References Cited
UNITED STATES PATENTS

| | | | |
|---|---|---|---|
| 3,410,157 | 11/1968 | Livezey | 74/758 |
| 3,678,784 | 7/1972 | Lemieux | 74/759 |
| 3,722,300 | 3/1973 | Crooks | 74/705 X |
| 3,722,301 | 3/1973 | Crooks | 74/705 X |
| 3,739,647 | 6/1973 | Crooks | 74/759 X |

FOREIGN PATENTS OR APPLICATIONS

| | | | |
|---|---|---|---|
| 669,348 | 8/1963 | Canada | 74/758 |

*Primary Examiner*—Samuel Scott
*Assistant Examiner*—P. S. Lall
*Attorney, Agent, or Firm*—Arthur L. Nelson

[57] ABSTRACT

A six speed power shift transmission having three planetary gearsets and a countershaft gearset with one of the planetary gearsets providing a reverse gear drive. The shifting is accomplished by five hydraulically actuated clutches and one brake to provide six forward speeds and one reverse.

10 Claims, 4 Drawing Figures

| RANGE | CLUTCHES | TORQUE RATIO | MILES PER HOUR | |
|---|---|---|---|---|
| | | | LO | HI |
| R | 40-60 | 2.5615 | 2.758 | 7.143 |
| 1 | 40-10 | 3.9310 | 1.797 | 4.655 |
| 2 | 50-10 | 2.8319 | 2.495 | 6.461 |
| 3 | 50-40 | 2.0417 | 3.460 | 8.962 |
| 4 | 50-30 | 1.6060 | 4.399 | 11.39 |
| 5 | 50-20 | 1.2722 | 5.553 | 14.38 |
| 6 | 40-20 | 1.0000 | 7.065 | 18.30 |

SIX SPEED POWER SHIFT TRANSMISSION

This invention relates to a vehicle transmission and more particularly to a planetary transmission with a countershaft gearset with hydraulically actuated brake and clutches to provide six forward speeds and one reverse.

The conventional tractor is provided with a transmission having a plurality of gear ratios with each successive gear ratio increasing the speed of travel of the vehicle and a corresponding decreasing in the torque ratio of the transmission. This accordingly adapts the power output of the engine to the draft load required of the tractor. With increasing speed and decreasing torque of successive gear ratios, it is desirable that each ratio provide a uniform increase in speed over the range of speeds from the lowest to the highest speed ratio of the tractor. This will adapt the tractor for use in an infinite number of different draft load requirements and speed requirements depending on the implement which is being drawn by the tractor.

Accordingly, this invention provides for a six speed power shift transmission in which the gear ratio changes are uniform and only vary between 25 to 38 percent which gives the operator a better choice of speed and torque requirement of the transmission to adapt the tractor to whatever load is required. The transmission also provides a reverse gear ratio which is independent of any of the forward gear ratios by providing a separate planetary gearset in the transmission designed only for the reverse drive in the transmission.

It is an object of this invention to provide a planetary transmission with a countershaft gearset and hydraulically actuated brake and clutches to provide one reverse and six forward speeds in a tractor transmission.

It is another object of this invention to provide a planetary transmission with three planetary gearsets with one of the planetary gearsets providing a reverse drive in the transmission without affecting any of the forward gear ratios.

It is a further object of this invention to provide a combination planetary and countershaft transmission with a highlow range transmission connected to the output of the transmission to provide twelve forward gear ratios and two reverse gear ratios.

It is a further object of this invention to provide a planetary transmission with selective drive into the transmission through one of the three elements of a planetary gearset including the ring gear, planetary carrier, and sun gear or a countershaft gearset.

It is a further object of this invention to provide a transmission for selective drive of the output shaft from any of the three planetary gearsets or the countershaft gearset selectively connected to the output shaft.

The objects of this invention are accomplished by providing an input and an output shaft rotating on a common axis of rotation. The transmission includes three planetary gearsets with the sun gears of the three planetary gearsets rotating on the common axis. A countershaft gearset is also provided to drive through a countershaft on an axis parallel with the common axis and interconnected through gears between a front clutch housing and a rear clutch housing. Clutching means selectively connect the elements of the planetary gearsets for driving through the countershaft gearset. The transmission selectively drives through one or more of the planetary gearsets and through the countershaft gearset to provide six forward gear ratios and one reverse for the transmission. Connected to the output of the transmission is a range transmission to selectively double the number of output speeds of the transmission to provide twelve forward speeds and two reverse speeds from the range transmission to drive the vehicle.

Referring to the drawings the preferred embodiment of this invention is illustrated.

Figures 1, 2:
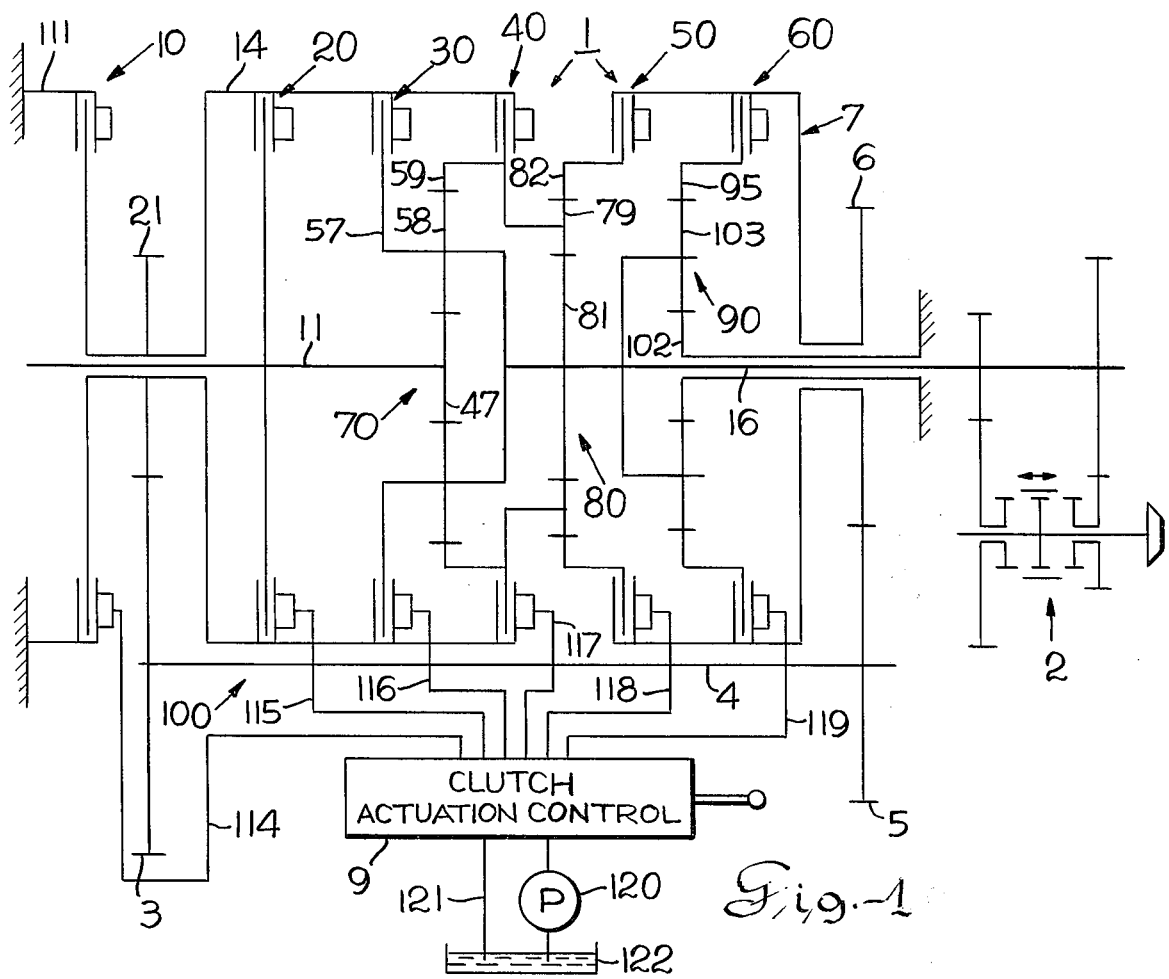
FIG. 1 illustrates a diagram of the transmission.
FIG. 2 illustrates a table of torque ratios, and speeds in miles per hour based on a predetermined drive ratio of the rear axle and drive wheel diameter.

Referring to the drawings, FIG. 1 illustrates a main planetary transmission 1 and a two-speed range transmission 2 at the output of the main transmission 1. The main transmission includes a brake 10 and planetary clutches 20, 30, 40, 50 and 60. The main transmission 1 includes a front planetary gearset 70 and intermediate planetary gear set 80 and a rear planetary gearset 90. Also included in the transmission is a countershaft gearset 100 which includes a drive gear 21 of front clutch housing 14. The drive gear 21 drives the countershaft driven gear 3 which is connected to the drive shaft 4 which in turn drives the countershaft drive gear 5 which meshes with the driven gear 6 on the rear clutch housing 7. The hydraulic system includes a clutch and brake actuating means 9, and a plurality of conduits directed to a hydraulic actuator in each of the brake and clutches.

Figure 3:
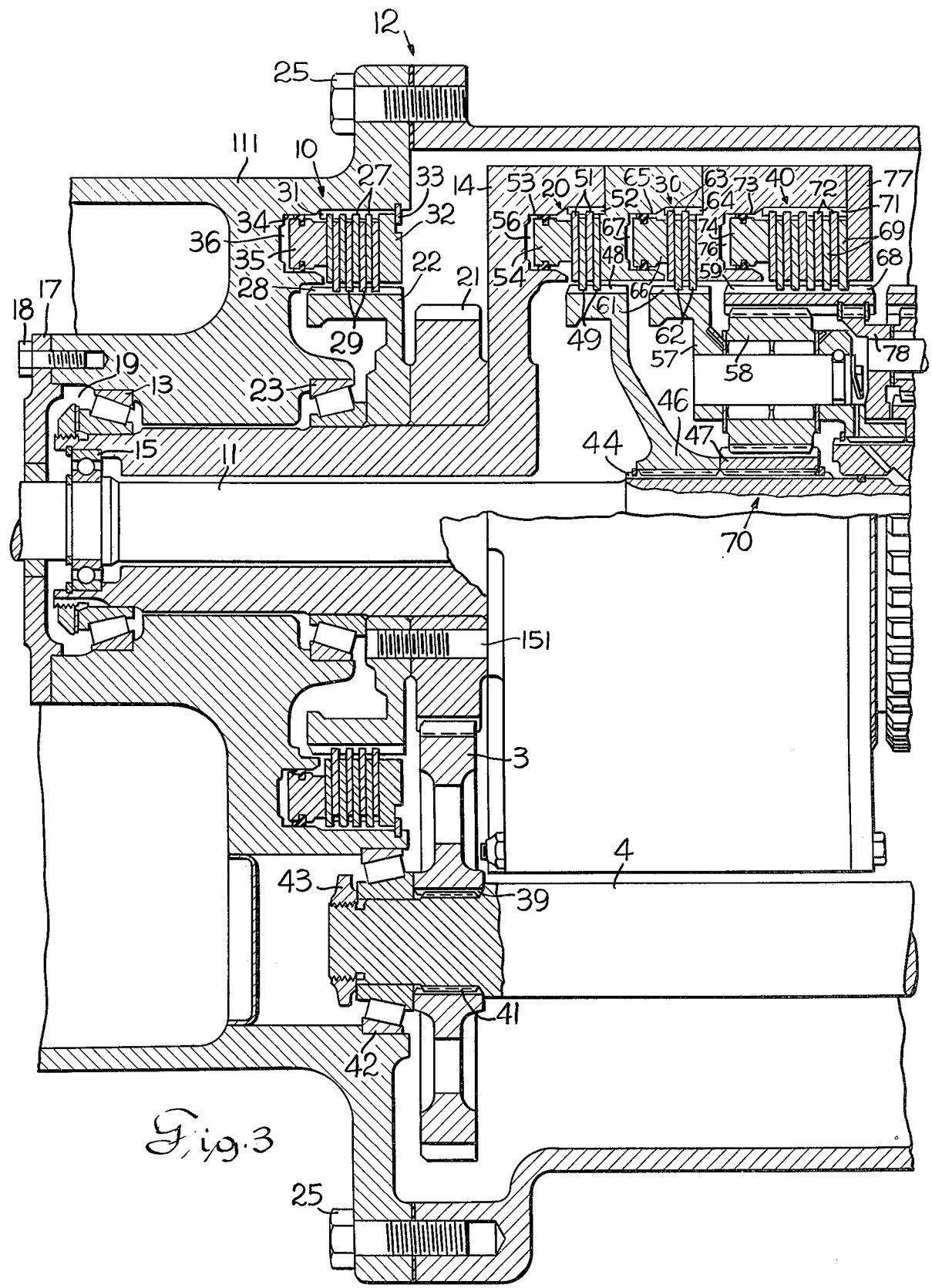
FIG. 3 is a cross section view of the forward portion of the transmission.
Figure 4:
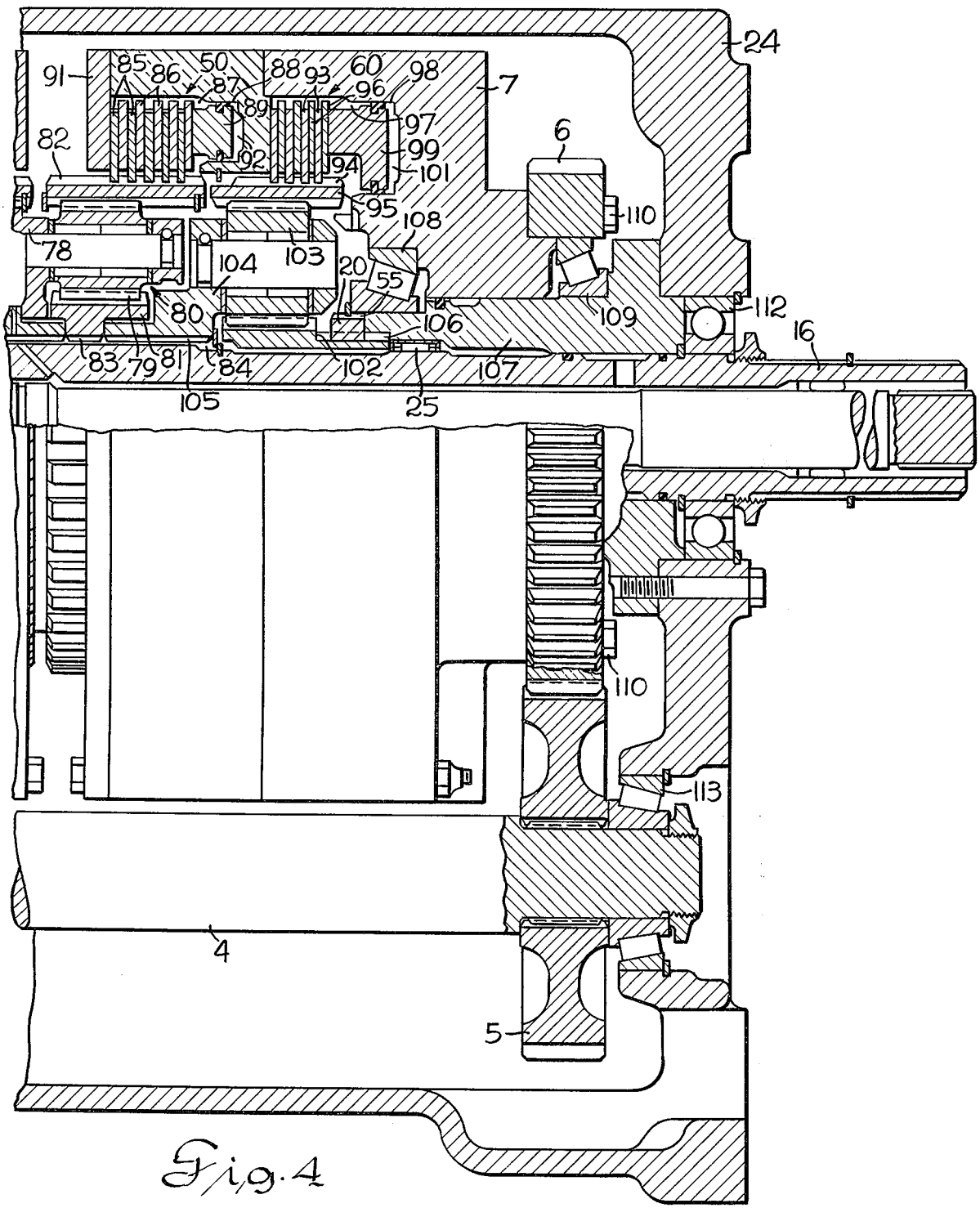
FIG. 4 is a cross section view of the rear portion of the transmission.

The diagram illustrates a transmission in FIG. 1 which is the same transmission as shown in FIGS. 3 and 4.

The input shaft 11 is rotatably supported in the front section 111 of the transmission housing 12. The front section 111 embraces the bearing assemblies 13 and 23 which in turn rotatably support front clutch housing 14. The front clutch housing 14 is rotatably supporting the bearing assembly 15 in turn rotatably supports the input shaft 11 which extends through the output shaft 16. The endplate 17 is fastened by a plurality of bolts 18 and encloses the bearing compartment 19 in the front section 111 of the transmission housing 12.

The front clutch housing 14 carries a drive gear 21 and clutch hub 22 which are fastened to the front clutch housing 14 by a plurality of bolts 151.

The rear section 24 of the transmission housing 12 is fastened to the front section 111 of the transmission housing 12 by a plurality of bolts 25.

The brake 10 includes the rotating brake discs 29 mounted on the spline 28 at brake hub 22. The stationary brake discs 27 are retained in slots 31 at the front section 111 of the transmission housing 12.

The reaction plate 32 is retained by the snap ring 33 in the front section 111 of the transmission housing 12. The front section 111 of the transmission housing 12 forms a hydraulic cylinder 34 which receives a piston 35. When fluid is pressurized in the pressuring chamber 36 the piston 35 moves axially to the rear to compress the discs 27 and 29 to engage the brake.

The drive gear 21 drives a driven gear 3 which is connected to the countershaft 4 by the spline 39 on the driven gear 3 and the spline 41 on the countershaft 4. The countershaft 4 is rotatably supported on the bearing assembly 42 which is held by retainer 43 on the countershaft 4. The bearing assembly 42 is rotatably supported in the front section 111 of the transmission housing 12.

The input shaft 11 is formed with the spline 44 for connection to mating splines on the clutch hub 46 and the sun gear 47. The sun gear 47 is an element of the front planetary gear set 70. The clutch hub 46 forms a spline 48 for receiving clutch discs 49 of the clutch 20. The discs 51 are connected by slots 52 to the front clutch housing 14. The front clutch housing 14 forms the hydraulic cylinder 53 which receives the piston 54. When fluid in the pressurizing chamber 56 is pressurized the piston 54 compresses the discs 49 and 51 to engage the clutch 20.

The hydraulic clutch 30 connects the front clutch housing 14 with planetary carrier 57. Planetary carrier 57 on the front planetary gearset 70 carries the planet gears 58. The planet gears mesh with the sun gear 47 and the ring gear 59. Carrier 57 is also connected to output shaft 16 by spline 84.

The planetary carrier 57 forms a spline 61 which carries the clutch discs 62. The clutch discs 63 are carried by slots 64 in the front clutch housing 14. The front clutch housing 14 forms the hydraulic cylinder 65 which receives the piston 66. When fluid is pressurized in the pressurizing chamber 67 the piston 66 compresses the discs 62 and 63 to actuate the clutch 30.

The ring gear 59 forms the spline 68 which engages clutch discs 69 of the clutch 40. The front clutch housing 14 is formed with slots 71 which engage the clutch discs 72. The front clutch housing 14 forms the cylinder 73 which receives the piston 74. When fluid is pressurized in the hydraulic fluid pressurizing chamber 76 the piston 74 engages the clutch discs 72 and 69. The reaction force on plate 77 provides a reaction force in opposition to the force of fluid pressure in hydraulic fluid pressurizing chamber 76 which the clutch is engaged.

The ring gear 59 in the front planetary gearset 70 is connected to the planetary carrier 78 in the intermediate planetary gearset 80. The planetary carrier 78 carries the planet gears 79 which mesh with the sun gear 81 and the ring gear 82 of the intermediate planetary gearset 80. The sun gear 81 forms a spline 83 which engages the spline 84 of the output shaft 16.

A hydraulic clutch 50 includes clutch discs 85 which are carried on the ring gear 82 of the intermediate planetary gearset 80. The clutch discs 86 are retained by slots 87 in the rear clutch housing 7. The rear clutch housing 7 forms the hydraulic cylinder 88 which receives the piston 89. The reaction plate 91 provides the reaction force during clutch actuation of clutch 50. When fluid is pressurized within the chamber 92, the piston 89 compresses the discs 86 and 85 to engage the clutch 50.

The clutch 60 includes the discs 93 which are carried on the spline 94 of the ring gear 95. The discs 96 are retained by slots 97 in the rear clutch housing 7. The rear clutch housing 7 forms a hydraulic cylinder 98 which receives piston 99. Cylinder 98 and piston 99 form the pressurizing chamber 101. When high pressure fluid is received in the pressurizing chamber 101, the clutch 60 is actuated.

The ring gear 94 and sun gear 102 mesh with the planet gears 103. The planet gears 103 are carried on the planetary carrier 104. The planetary carrier 104 forms spline 105 which engages the spline 84 on the output shaft 16. The sun gear 102 forms the slots 106 which receive keys 20 which are also received in slots 55 of sleeve 107 which fastens to the rear section 24 of the transmission housing 12. The bearings 108 and 109 rotatably support the rear clutch housing 7 which also carries the driven gear 6 which is fastened to the rear clutch housing 7 by a plurality of bolts 110.

The output shaft 16 is rotatably mounted in the bearing assembly 112 which is embraced by the rear section 24 of the transmission housing 12. Shaft 16 is supported by bearing 112, and needle bearing 25 in sleeve 106. See FIG. 4.

The driven gear 6 meshes with the drive gear 5 of the countershaft 4. Countershaft 4 is rotatably mounted in the bearing assembly 113 which is received within the rear section 24 of the transmission housing 12.

The hydraulic actuating system includes a hydraulic brake and clutch actuating means 9. The conduit 114 connects the hydraulic clutch and brake actuator 9 to the brake 10. The conduits 115, 116, 117, 118 and 119 connect the hyraulic clutch and brake actuating means 9 to the clutches 20, 30, 40, 50 and 60, respectively.

The pump 120 provides pressurized fluid supplied to the clutch and brake actuating means 9. Hydraulic fluid is returned through the conduit 121 to the sump 122.

The operation of the transmission will be described in the following paragraphs.

When the clutches 40 and 60 are actuated, the transmission is in reverse. In this position, the input shaft 11 is driving the sun gear 47, and the input clutch housing 14 and the output clutch housing 7 are driven in counterrotation to produce a counterrotation on the ouput shaft 16 to provide a reverse gear drive for the transmission.

When the transmission is placed in the first forward speed, the clutch 40 and the brake 10 are engaged. This locks the input clutch housing 14 and the sun gear drives the planetary carrier 57 for the front planetary gearset which in turn drives the output shaft 16 in the forward direction generating a high torque output.

When the transmission is placed in the second forward speed, the clutch 50 and the brake 10 are engaged. This in turn locks the input clutch housing 14 and the output clutch housing 7 and drives through the first and the second planetary gearsets 70 and 80 to provide a positive rotation of the output shaft 16.

When the vehicle transmission is placed in third gear, the clutch 50 and the clutch 40 are engaged. The power is transmitted from the first planetary gearset 70 through the second planetary gearset 80 as well as the countershaft gearset 100 to drive the output shaft 16 in the third forward speed.

When the transmission is placed in the fourth forward speed, the clutches 30 and 50 are engaged. The power is transmitted through the first and second planetary gearset to drive the planetary carrier of the intermediate planetary gearset and through the countershaft gearset 100 to the output shaft 16 in the fourth speed range.

When the transmission is positioned in the fifth speed range, the clutches 50 and 20 are engaged. The sun gear is rotating synchronously with the input clutch housing 14 and drives through the first and second planetary gears as well as the countershaft gearset 100 to provide the fifth speed range.

When the transmission is placed in the sixth speed range, the clutches 40 and 20 are engaged and the front planetary gearset is locked to drive the output shaft in a direct drive from the input shaft and the transmission operates in a high speed range.

The transmission can be locked when the brake 10 and the clutch 30 are engaged or when the brake 10 and the clutch 60 are engaged.

The embodiments of the invention in which an exclusive property or privilege is claimed are defined as follows:

1. A vehicle transmission comprising, an input shaft and an output shaft rotatably mounted in a transmission casing and on a common axis of rotation, a front planetary gearset having a sun gear connected to said input shaft, an intermediate planetary gearset, a rear planetary gearset having a sun gear connected to said transmission casing, each of said planetary gearsets including a sun gear having an axis mounted on said common axis, each of said planetary gearsets including the elements of a sun gear, a ring gear, and a planetary carrier, means connecting the planetary carriers of said front planetary gearset and said rear planetary gearsets and the sun gear of said intermediate planetary gearset to said output shaft, means connecting the ring gear of the front planetary gearset and the planetary carrier of the intermediate planetary gearset, a front clutch housing and a rear clutch housing rotatably mounted on said common axis, a countershaft gearset rotatably mounted on a second axis parallel with said common axis including a drive gear on said front clutch housing, a driven gear on said rear clutch housing, and a countershaft having gears engaging said drive and driven gears of said clutch housings, a plurality of clutches connected to said front clutch housing, each clutch including a friction member singularly connected to at least one of said elements of said front planetary gearset, a plurality of clutches connected to said rear clutch housing, each of said clutches connected to said rear clutch housing including a friction member singularly connected to at least one of said ring gears of said intermediate planetary gearset and said rear planetary gearset, means selectively engaging said clutches to selectively provide power paths through said transmission.

2. A vehicle transmission as set forth in claim 1 including a brake connected to said transmission casing, said brake including a friction member connected to said front clutch housing.

3. A vehicle transmission as set forth in claim 1 wherein one of said clutches connected to said front clutch housing includes a friction member connected to the ring gear of said front planetary gearset, one of said clutches connected to said rear clutch housing includes a friction member connected to the ring gear of said rear planetary gearset to provide reverse rotation of the output shaft of said transmission.

4. A vehicle transmission as set forth in claim 2 wherein said brake includes a friction member connected to said front clutch housing, one of said clutches connected to said front clutch housing includes a friction member connected to the ring gear of said front planetary gearset to provide a high torque and forward rotation of the output shaft.

5. A vehicle transmission as set forth in claim 1 wherein said transmission includes a brake connected to said transmission housing, said brake includes a friction member connected to the front clutch housing, one of said clutches connected to said rear clutch housing includes a friction member connected to the ring gear of said intermediate planetary gearset to provide a high torque forward rotation of the output shaft.

6. A vehicle transmission as set forth in claim 1 wherein one of said clutches connected to said front clutch housing includes a friction member connected to the ring gear of said front planetary gearset, one of said clutches connected to the rear clutch housing includes a friction member connected to the ring gear of said intermediate planetary gearset to provide forward rotation of the output shaft.

7. A vehicle transmission as set forth in claim 1 wherein one of said clutches connected to said front clutch housing includes a friction member connected to the planetary carrier of said front planetary gearset, one of said clutches connected to said rear clutch housing includes a friction member connected the ring gear of said intermediate planetary gearset to thereby provide a forward rotation of the output shaft.

8. A vehicle transmission as set forth in claim 1 wherein one of said clutches connected to said front clutch housing includes a friction member connected to the sun gear of said front planetary gearset, one of said clutches connected to said rear clutch housing includes a friction member connected to the ring gear of said intermediate planetary gearset to provide a forward rotation of the output shaft of said transmission.

9. A vehicle transmission as set forth in claim 1 wherein one of said clutches connected to said front clutch housing includes a friction member connected to the sun gear of said front planetary gearset, one of said clutches connected to said front clutch housing includes a friction member connected to the ring gear of said front planetary gearset to thereby lock the front planetary gearset and drive directly from the input shaft to the output shaft of said transmission.

10. A vehicle transmission as set forth in claim 1 including a two-speed range transmission connected to said vehicle transmission to double the number of output speeds of said vehicle transmission.

* * * * *